United States Patent
Casadei

(10) Patent No.: US 9,206,586 B2
(45) Date of Patent: Dec. 8, 2015

(54) CONTROL SYSTEM FOR A MACHINE FOR DIGGING AND/OR DRILLING SOIL AND DIGGING AND/OR DRILLING MACHINE INCLUDING SUCH A SYSTEM

(71) Applicant: Soilmec S.p.A., Cesena (FC) (IT)

(72) Inventor: Giovanni Casadei, Cesena (IT)

(73) Assignee: Soilmec S.p.A., Cesena (FC) (IT)

(*) Notice: Subject to any disclaimer, the term of this patent is extended or adjusted under 35 U.S.C. 154(b) by 606 days.

(21) Appl. No.: 13/622,507

(22) Filed: Sep. 19, 2012

(65) Prior Publication Data

US 2013/0075156 A1 Mar. 28, 2013

(30) Foreign Application Priority Data

Sep. 20, 2011 (IT) .............................. TO2011A0834

(51) Int. Cl.
| | |
|---|---|
| E02F 5/14 | (2006.01) |
| E02F 9/20 | (2006.01) |
| G01L 3/00 | (2006.01) |
| G01P 3/00 | (2006.01) |
| G06F 15/00 | (2006.01) |
| E02D 17/13 | (2006.01) |
| E02F 3/20 | (2006.01) |

(52) U.S. Cl.
CPC ............. *E02F 9/2004* (2013.01); *E02D 17/13* (2013.01); *E02F 3/205* (2013.01); *E02F 9/2016* (2013.01); *G01L 3/00* (2013.01); *G01P 3/00* (2013.01); *G06F 15/00* (2013.01)

(58) Field of Classification Search
CPC ............. B66D 1/50; B66D 1/54; B66D 1/44; B66C 13/04; B66C 13/08; E02D 17/13; E02F 3/205; E02F 3/26; E02F 9/2203; E02F 9/2004; E02F 9/2016; G01L 3/00; G01P 3/00

USPC .................... 37/91, 189, 365, 396, 401, 462; 175/104, 91, 96; 299/31, 75, 106; 405/263, 266, 267; 701/50

See application file for complete search history.

(56) References Cited

U.S. PATENT DOCUMENTS

| | | | | |
|---|---|---|---|---|
| 4,436,476 A | * | 3/1984 | Yoritomi ...................... | 414/690 |
| 7,559,161 B2 | * | 7/2009 | Stoetzer ........................ | 37/189 |
| 7,661,209 B2 | * | 2/2010 | Arzberger et al. ............. | 37/189 |
| 8,020,323 B2 | * | 9/2011 | Chagnot et al. ................ | 37/189 |
| 2013/0245816 A1 | * | 9/2013 | Langer et al. ................. | 700/228 |

FOREIGN PATENT DOCUMENTS

| | | |
|---|---|---|
| EP | 0 790 356 A1 | 8/1997 |
| JP | 63 247425 A | 10/1988 |
| JP | 3 281825 A | 12/1991 |

OTHER PUBLICATIONS

Search Report in IT TO20110834, Jun. 25, 2012, 2 pages.

* cited by examiner

*Primary Examiner* — Robert Pezzuto
(74) *Attorney, Agent, or Firm* — Fish & Richardson P.C.

(57) ABSTRACT

A control system for a machine for digging and/or drilling earth, wherein the machine for digging and/or drilling earth comprises a digging head arranged to dig the soil, a flexible load-bearing cable arranged to support the digging head during normal operation, at least a first winch and a second winch, each of which in turn comprises a drum about which at least part of the flexible load-bearing cable can be wound, and a motor arranged to actuate the drum; the control system has an electronic control unit adapted for controlling the movement of the winches and a velocity sensor device arranged in each branch of load-bearing cable coming out from the winches adapted for monitoring the movement of the load-bearing cable.

19 Claims, 2 Drawing Sheets

CONTROL SYSTEM FOR A MACHINE FOR DIGGING AND/OR DRILLING SOIL AND DIGGING AND/OR DRILLING MACHINE INCLUDING SUCH A SYSTEM

BACKGROUND

The present invention concerns a control system for a machine for digging and/or drilling earth and a digging and/or drilling machine comprising such a system, able to be used in particular in the field of civil engineering.

In order to contain or reinforce earth it is known to make temporary or permanent buried walls, commonly called "diaphragms", or walls, or diaphragm walls.

In order to make these digging and/or drilling machines are used that are equipped with digging heads, like for example the hydraulic bucket, the cabled bucket, the hydromilling machine and so on. Such digging heads are generally moved, or in any case supported during normal operation of the machine, by a load-bearing cable, which is wound or unwound around the drum of a motor winch.

In order to carry out digging that is as vertical as possible, it may be required during drilling that the digging device not be completely rested on the bottom of the excavation, but that it always be held by the lifting cable. In this way, the digging device is always hung from the lifting cable and under the action of the force of gravity behaves like a sort of "plumb line" or "pendulum".

In the case of the hydromilling machine, the debris resulting from the digging is extracted and taken to the surface by means of a centrifugal pump. The maximum flow rate of this pump is defined at the design stage and consequently sets a maximum velocity of descent of the hydromilling machine during drilling. Descending at high velocities, the pump would not be able to evacuate all of the debris that is dug by the toothed wheels of the hydromilling machine and consequently the hydromilling machine would rest on the bottom of the excavation, on the materials accumulated and not evacuated. In this way, the mill would tilt with respect to the vertical, altering the quality of the diaphragm. Moreover, the digging teeth would sink too far into the earth, with the possibility of jamming the wheels in the ground. This can cause the digging operations to slow down, as well as causing the wheels or the motors that move them to break, making it necessary to extract the mill from the excavation for it later to be reset. Consequently, there will be a lengthening of the drilling times and of the relative costs.

However, the toothed wheels are not always able to produce an amount of debris that allows the pump to be exploited to the fullest. When dealing with earth that is very difficult to dig, the velocity of descent is no longer dictated by the maximum flow rate of the pump but by the digging velocity of the wheels.

It is obvious that by making the hydromilling machine descend at velocities that are too low, verticality is maintained, but the toothed wheels are prevented from going into the earth and advancing in the drilling, negatively affecting digging performance.

In particularly difficult earth, like for example rocky layers with high resistance to compression and not very fractured, the optimal velocity of descent can take on very small values, of the order of a few centimeters per minute.

Moreover, in this case it is necessary to use very heavy digging heads to increase the digging efficiency so that actual production depends on the thrust that is exerted on the cutting element (digging tooth) and on how close it is to the optimal value for that particular type of earth. Such a weight thus forces the use of winches that must be able to develop a very high pulling force through the load-bearing cable. By using known winches it is very complicated to move the digging heads at very low velocities. The winches currently known, indeed, are equipped with a single hydraulic motor, coupled with the drum through a gearmotor. The hydraulic motors typically used in these winches are piston motors, commonly known as high-speed motors, because they are not suitable for operating at low velocities generally below 50 revs per minute. Indeed, when the rotation velocity of the motor reaches values close to the aforementioned lower limit, the efficiency of the motor and the torque able to be delivered by it undergo a drastic drop.

In light of the above, in order to reach very low velocities of descent with the hydraulic motors described above, the load-bearing cable is usually relayed a predetermined number of times through many pulleys arranged between the winch and the digging head. In this way there is a multiplication of the pulling force, very often even more than quadrupled. However, this involves a substantial increase in the amount of cable to be stored on the drums (which is at least proportional to the depth and the number of relays on the tackle), forcing the use of very bulky winches that make it difficult to transport the digging machine and increase its production cost.

Moreover, the use of a large number of pulleys involves longer descent and ascent times of the digging heads at the start and end of digging, respectively. Therefore, what may be acceptable during digging, by increasing the number of relays to control very low velocities and neglecting the consequent increase in the amount of cable, would no longer be acceptable with reference to the ascent and descent times of the head.

One only has to think that the movement systems currently known have maximum velocity of descent and ascent of the digging and/or drilling apparatus of about 6-8 m/min and, consequently, the use of such movement systems at depths of 250 m involves descent and ascent times of about 30 min. Increasing the number of relays involves a further lengthening of these times, which would become unacceptable.

There are currently also known digging machines provided with two winches to wind or unwind the load-bearing cable of the digging head, wherein each winch is actuated by a high-speed hydraulic motor. Being able to store double the amount of lifting cable on the two drums, it is possible to arrange a greater number of relays of the cable and to make the digging head move forward at lower velocities. However, these machines with two winches continue to offer a relatively limited field of variation of the velocity, limited maximum velocities of forward motion and low ability to finely adjust the velocity of forward motion at low operating velocities.

Lifting systems are known which provide for the use of two winches with a single cable. Such a system is described in U.S. Pat. No. 6,926,259. In practice, in it an end of the cable is connected to the first drum, relayed through pulleys up to the digging device and connected with the other end to the second drum. This provision makes it possible to store the cable on two drums rather than on just one. In this way it is possible to keep the size of the drums small, having to contain at most a little over half of the cable.

A system of mobile pulleys allows the tackle to be modified by moving the pulleys from the trolley to the vertical guide tower. In this way, it is possible to "manually" and discreetly change the range of velocities of the digging device.

The use of small sized winches also prevents the maximum pulling force able to be delivered to the cable from drastically reducing. Indeed, it decreases with a law proportional to the diameter of the drum. However, this solution has the drawback of having to move the pulleys from the mast to the trolley in order to be able to move the digging device at very low velocities. This process is certainly slow and complicated and not very safe, also requiring a very complex manual intervention.

Patent EP0538630 shows a winch equipped with two hydraulic motors, at least two epicycloidal gearings and a juxtaposition gear. The solution makes it possible to increase the range of velocities covered by the winch, to add the powers of the two motors and to finely adjust the velocity of the cable.

However, this remains a single-drum solution, which does not allow enormous amounts of cable to be stored and that is wasteful due to the gearings used. Moreover, it is not interchangeable with classical winches with a single motor given the much greater lateral dimensions.

The U.S. Pat. No. 7,503,548 describes a lifting device formed from two winches that can be synchronised through the action of two belts.

Each of the two winches is moved by a hydraulic motor with reducer. Both of the drums are connected through a belt to a special synchronisation shaft. In normal conditions, the two winches behave like two independent standard winches. By placing the hydraulic channel 76 under pressure the coupling is activated by friction between the two synchronisation wheels that are constrained to rotate together on the synchronisation shaft. In this way, the winches are mechanically forced to rotate in the same direction and with the same velocity. This characteristic is useful to obtain a synchronised lifting of the same load. The belts are toothed, and as alternatives to them it is possible to use toothed wheels. The two winches, when the synchronisation device is activated, are constrained to rotate in the same direction, i.e. they both unwind or collect cable.

This solution, having two drums, makes it possible to store the cable necessary for our purpose, but it does not allow the low velocities that would be needed to be obtained.

SUMMARY

The purpose of the present invention is to avoid the aforementioned drawbacks and in particular to provide a machine for digging and/or drilling earth that is able both to finely adjust the velocity of descent and/or ascent of the digging heads even to very low values of such a velocity, and to reach maximum velocities of forward motion and relatively great maximum digging depths.

In a first aspect of the invention, such a purpose is achieved with a control system for a machine for digging and/or drilling earth having the characteristics according to claim 1.

In a further aspect of the invention, such a purpose is achieved with a digging machine having the characteristics according to claim 16.

Further characteristics of the control system for a machine for digging and/or drilling earth and of a machine for digging and/or drilling earth are the object of the dependent claims.

DESCRIPTION OF THE DRAWINGS

The characteristics and advantages of a control system for a machine for digging and/or drilling earth and of a machine for digging and/or drilling earth according to the present invention will become clearer from the following description, given as an example and not for limiting purposes, referring to the attached schematic figures, in which.

DETAILED DESCRIPTION

Figure 1:
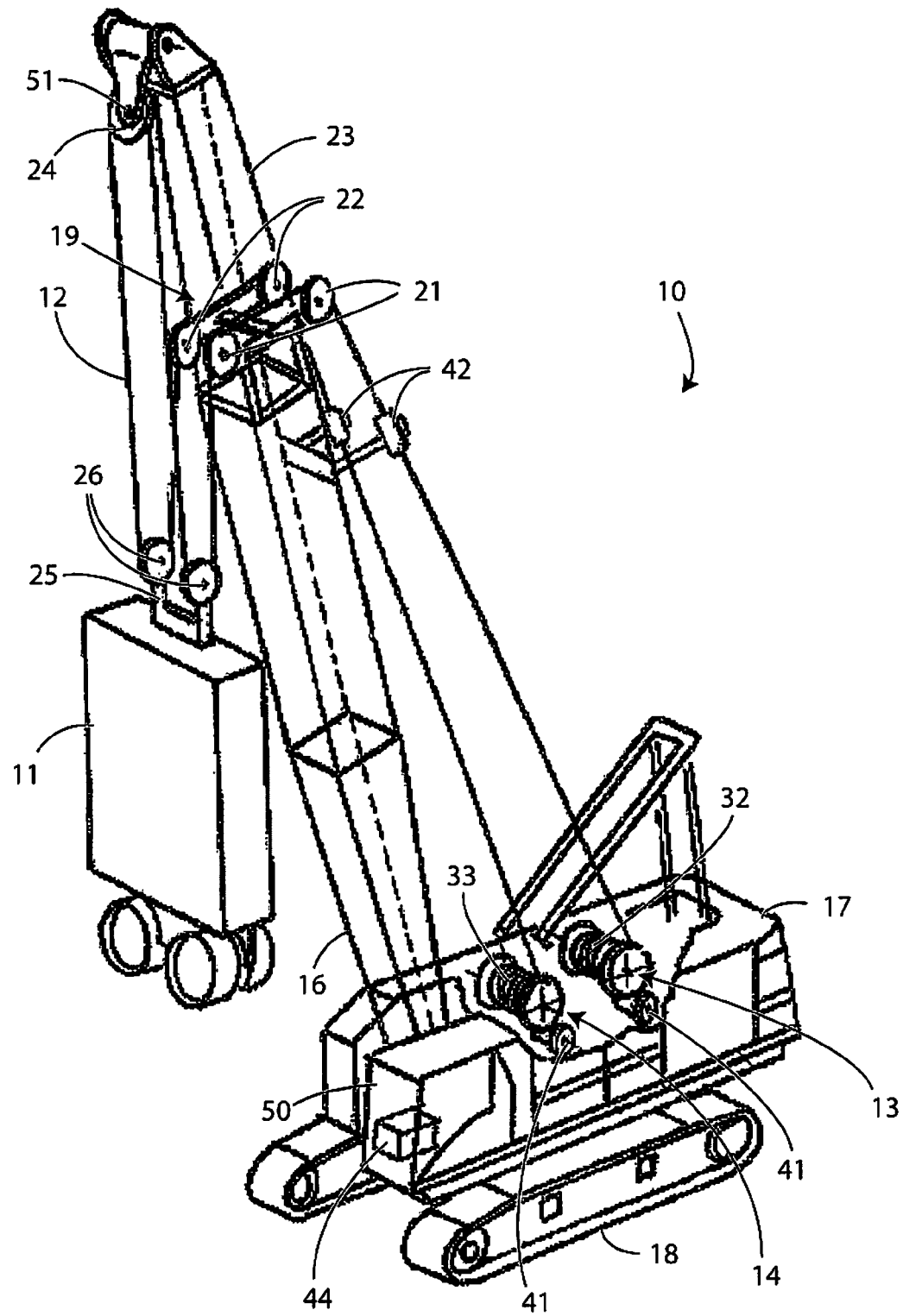
FIG. 1 is a perspective view partially in section of an embodiment of a machine for digging and/or drilling earth according to the present invention.
Figure 2:
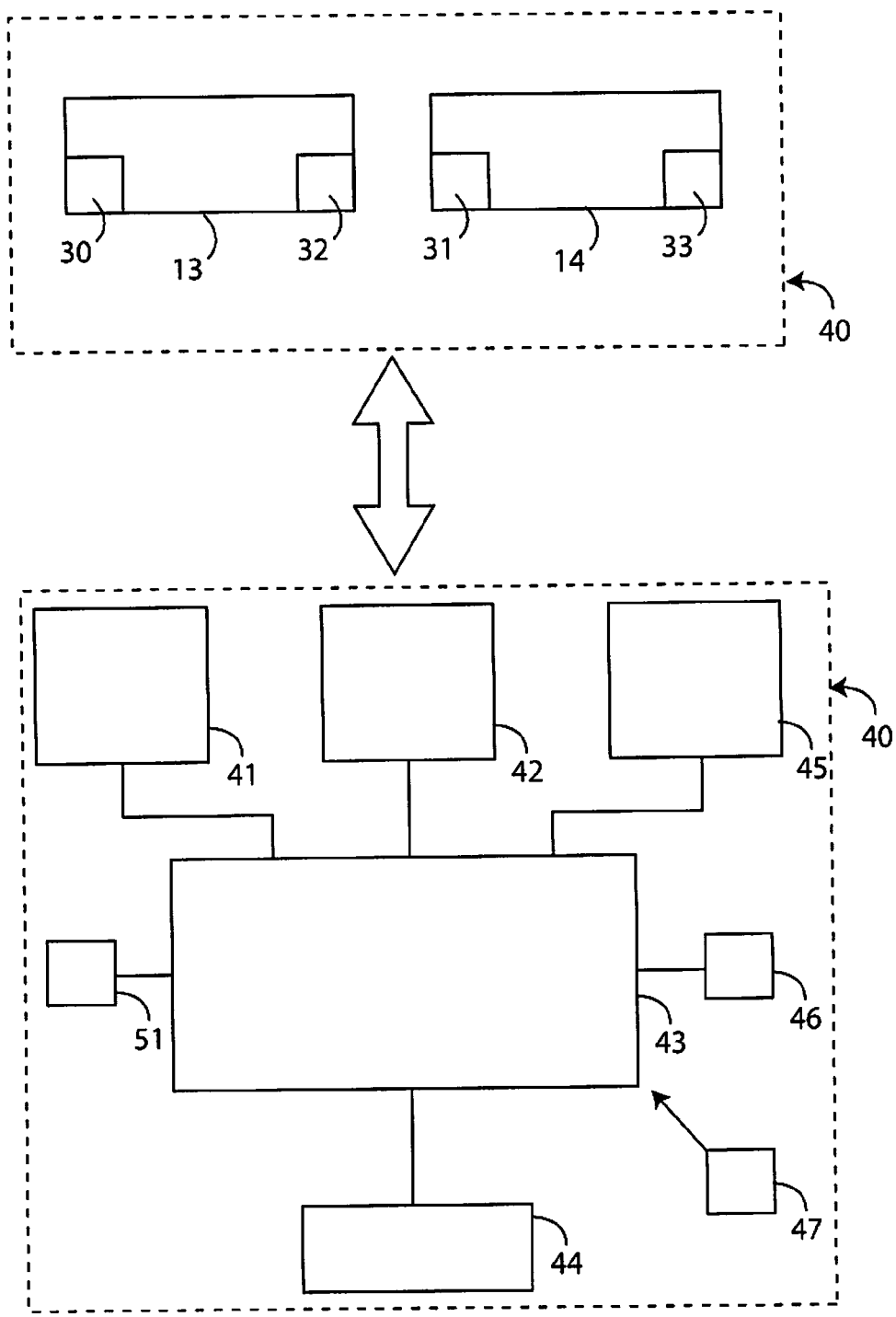
FIG. 2 is a block diagram of an embodiment of a control system for a machine for digging and/or drilling earth according to the present invention.

With reference to the figures, a machine for digging and/or drilling earth is shown, wholly indicated with 10.

The digging and/or drilling machine 10 comprises a digging head 11 arranged to dig the soil and a flexible load-bearing element 12 arranged to support the digging head 11 during normal operation of the machine 10 itself.

Preferably, such a flexible load-bearing element 12 can be a load-bearing cable, or a chain, or a belt, or another elongated element capable of being wound or unwound and able to support the digging head 11. In any case, in the rest of the present description we will refer as a non-limiting example to a load-bearing cable 12.

Preferably, the digging head 11 comprises at least one cabled bucket, or else at least one hydraulic bucket, or at least one hydromilling machine, or any known digging tool adapted for digging for example wells or trenches for diaphragm walls.

The digging and/or drilling machine 10 also comprises at least a first 13 and a second 14 winch, each of which in turn comprises a drum 32, 33, about which at least part of the load-bearing cable 12 can be wound. Each winch 13, 14 also comprises a motor 30, 31 arranged to actuate the corresponding drum 32, 33.

Each motor 30, 31 can be equipped with a corresponding gearmotor for coupling with the drum 32, 33, or it can be connected directly to the drum itself 32, 33.

In the particular illustrated embodiment of the present invention the digging and/or drilling machine 10 comprises a load-bearing arm 16 constrained at one end to a support tower 17, preferably rotatable. In the case in which the digging machine 10 is a vertical tower drill, the load-bearing arm 16 is preferably made as a box-shaped body and is fixed to the support tower 17 in substantially vertical position.

The support tower 17 is also preferably provided with movement means 18, like for example tracks or wheels that allow the digging machine 10 to move.

The head 19 of the load-bearing arm 16 can be equipped with a first 21 and a second 22 pair of pulleys. From the head 19, as can be seen in FIG. 1, an extension of the load-bearing arm 16 preferably extends, to the top of which an upper return pulley 24 is constrained, preferably tilting about a horizontal transversal axis. Moreover, the digging head 11 can be equipped with a pulley block 25 comprising a third pair of lifting pulleys 26 (when the lifting pull has a fourth tackle, like that represented in the figure).

The load-bearing cable 12 is thus fixed at one end to the drum 32 of the first winch 13, relayed, as illustrated, through the first 21 series of pulleys, the first pulley of the third 26 pair of pulleys, the upper return pulley 24, the second pulley of the third 26 pair of pulleys, the second 22 series of pulleys and finally fixed at the other end to the drum 33 of the second winch 14.

According to an aspect of the present invention the digging and/or drilling machine 10 of earth comprises a control system 40 programmed or in any case arranged to actuate the digging head 11.

Such an operation is carried out by unwinding the load-bearing cable 12 from, or winding it back on, the drum 32, 33 of the first 13 or of the second 14 winch at a first running velocity of the cable 12, and at the same time by respectively winding the same load-bearing cable 12 onto, or unwinding it from, the drum 33, 32 of the second 14 or of the first 13 winch at a second running velocity of the cable 12.

The first and the second running velocity of the cable 12 are the linear velocities at which the portions of load-bearing cable 12 run downstream, respectively, of the first 13 and of the second 14 winch. For the purposes of the present invention the first and the second running velocity of the cable 12 are the same if both of the winches wind or unwind the cable; they are different if one of the two winches winds the cable up on itself, and the other unwinds it.

Again for the purposes of the present invention we mean that actuating the digging head 11 or keeping it suspended is equivalent to saying that the digging head 11 can be lowered or lifted or kept at the same height from the soil.

In particular, in a first working condition the first running velocity of the cable 12 is substantially different in absolute value and has the opposite direction with respect to the second running velocity. Therefore, to lower the digging head 11 it is necessary for the load-bearing cable 12 to be unwound from one of the two drums 32 or 33 faster than it is wound onto the other drum 33 or 32.

On the other hand, in order to lift the digging head 11 it is necessary for the load-bearing cable 12 to be rewound onto one of the two drums 32 or 33 faster than it is unwound from the other drum 33 or 32.

In a second working condition the first and the second running velocity are substantially the same in absolute value, but they have an opposite direction. In this case the load-bearing cable 12 is unwound from the drum 32 or 33 at the same velocity at which it is rewound by the other drum 33 or 32. In the second working condition, therefore, the control system 40 is able to keep the digging head 11 substantially still at the same height from the soil.

In a third working condition the first running velocity is substantially the same in absolute value as the second running velocity and has the same direction as it. In this case, the digging head 11 can be lowered or lifted at a very high velocity, since the two winches 13 and 14 work together to unwind or wind up the load-bearing cable 12 adding their pulling forces.

In any case, the direction of rotation of the two winches 13, 14 can be the same or opposite according to the direction of winding of the load-bearing cable 12 that depends on how the cable itself 12 is constrained to the drums 32 and 33 of the two winches 13, 14. If indeed, the cable 12 is wound on both of the drums 32 and 33 passing on top (as indicated in FIG. 1), both will have to rotate the same way to wind up or unwind, vice-versa if the cable 12 were wound on a first drum 32 or 33 from the bottom and on the second drum 33 or 32 from the top, the winches to wind up will have to rotate in opposite directions.

In a fourth working condition the control system 40 is programmed or in any case arranged to actuate just one of the two winches 13, 14.

This makes it possible to continue digging even in the case in which one of the two motors 30, 31 has failed. The control system 40 comprises velocity sensor means arranged in each branch of load-bearing cable 12 coming out from the winches 13, 14, adapted for monitoring the movement of such a load-bearing cable to detect at least the running velocity of the cable downstream of said winches.

Preferably, as shown in FIG. 1, such velocity sensor means comprise at least two first sensors 41, arranged to detect the rotation velocity and/or the direction of movement, of the two winches 13 and 14. Preferably, such sensor means also comprise two second 42 sensors arranged to detect the first and the second running velocity of the cable 12 downstream of said winches.

In this case the control system 40 advantageously comprises an electronic control unit 43 connected to the winches 13 and 14 and/or to their actuation systems (joystick, switch) and to the sensors 41 and/or 42. Such an electronic control unit 43 is at least arranged to control, based on the detections of the first 41 and/or of the second 42 sensors, the running velocity of the cable and the direction of movement of each of the winches 13 and 14, in such a way that a mathematical relationship, for example the algebraic sum, between the two running velocities reaches or comes as close as possible to a target value, which is related to the pulling tackle, produces the desired forward or return motion of the digging head 11.

The control on the suspension of the digging tool 11, exerted by the control system 40 is aimed at reaching a predetermined relationship between the two running velocities, like for example a predetermined target running velocity.

There are three modes through which it is possible to operate through the control unit: a manual one, a semi-manual one and an automatic one.

In the manual mode the operator acts directly on the actuation controls of the motors 30, 31 of the winches 13, 14 seeking the optimal velocity of descent, which in this case is a derived parameter. The control unit 43 based on the information received from the sensors 41 and/or 42 and based on the choice of pulling tackle (first, second, fourth, eighth, will determine the final velocity of movement of the digging tool 11 that will be displayed to the operator, on the control panel. The operator, by varying the velocity of one of the two motors 30, 31 or both, can operate with the different functionalities described earlier. The control system 40 will warn with alarm signals and will act with control feedback on the machine, indicating possible anomalies or problems that may be encountered (e.g. no more space to wind the cable on a drum, velocity too high, . . . ). The knowledge of the value of the velocity of movement of the digging tool 11 can be used as operating parameter for the second and third working modes, described hereafter.

It should be understood that determining the final velocity of movement of the digging tool is to be considered to be equivalent to determining the position of the digging tool at two different moments in time spaced apart by a known time. For example, by determining the position p1 of the tool at the moment in time t1 and determining the position p2 at the moment in time t2, it is possible to calculate the velocity of the digging tool by dividing the space covered (from p1 to p2) by the time passed (between t1 and t2). Therefore, determining a position of the digging tool at different moments in time is equivalent to determining the final velocity of movement and vice-versa. In this case the velocity sensor means therefore comprise means for measuring the position of the digging head 11 with respect to a predetermined reference point at predetermined time intervals.

In the semi-manual mode, the operator selects a desired operative velocity of descent or ascent, to keep the digging tool 11 in suspension, this being a value that can be determined based on own experience or on previous panels carried out. By setting such an operating velocity for the digging head 11, the control unit 43 determines, as a function of the pulling tackle present (dependent on the number of pulleys connected to the digging head 11), the differential velocity between the two branches of the cable 12. The control system, based on some design choices concerning operation, illustrated hereafter, will determine the pairs of velocities of the two branches in output from the winches 13 and 14, also determining their direction of rotation (the same or opposite), so that the cable 12 collects in a predetermined and voluntary manner on one of the two winches 13 or 14.

The third automatic operating mode provides for directly monitoring the digging parameters, through suitable digging sensors 47, measuring for example the rotation torque of the blades (through the value of the working pressure of the motors that actuate the milling wheels) and the revolutions of the milling heads. Such pairs of parameters combined with the actual weight that bears down on the digging teeth (given by the weight of the digging tool 11 itself from which the suspension pull is subtracted), the consequent instantaneous velocity of forward motion and the flow rate of the suction pump (installed on the tool body 8) of the digging debris, determine the actual correct progress of the digging. When the torque increases and/or the revolutions reduce it may be convenient to modulate the weight of the tool itself, in particular increasing the pull and slowing down the descent of the tool itself (thus reducing the differential velocity on the cable 12). Such control is carried out automatically by the unit 43 that will reduce the differential velocity by a predetermined amount, thus lightening the load on the digging teeth. Advantageously, the system is equipped with a load cell 46 positioned on one of the pins of the suspension pulleys (24 or 26) so as to directly detect the load on the pulley. Such a value, taking into account the tackle, will determine the overall pull in contrast to the weight of the tool (which is known). Such a system is more precise than that which derives the pull value of the cable starting from the pressure measurement of the motors 30, 31 of the winches, since such a measurement suffers from errors due to the performance and efficiency of the system (system efficacy, losses in friction in the motor-reducer-drum system, friction of the cables, . . . ). The control system 40 will detect the reduction in torque and the increase in revolutions obtained after having carried out said first control and consequently it can adjust the differential velocity of descent (increasing it), to continue digging with the maximum efficiency.

Preferably, the electronic control unit 43 is arranged to control the rotation velocities of the winches 13 and 14 in such a way that they reach optimal values, for example such as to maximise the pulling torques, or to maximise the efficiency of the motors 30, 31 or to minimise the wearing of the load-bearing cable 12 (also managing the maximum admissible velocity values).

Indeed, as an example, let us consider the case in which it is wished to lift/lower the digging head 11 at a velocity of ascent/descent equal to what there would be under the action of a winch that rotates at 1 rpm. In this case according to the present invention the drums of the two winches 13 and 14 can be made to rotate in such a way that the difference in the rotation velocities thereof is equal to 1 rpm and that optimal rotation velocities are reached (e.g. 1500 rpm and 1501 rpm).

In the minimum theory in which there are just the first sensors 41, and not the second sensors 42, such sensors are intended at least for measuring rotation velocities of the drums 32, 33. Determining the running direction of the cable can be detected from the same sensors 41 or from the direction taken up by the actuation (joystick, switch) that determines the movement of the drums 32, 33 (e.g. movement right for winding and left for unwinding, or up/down, etc.). Moreover, in a further embodiment the sensor means, in particular the first sensors 41, can be combined with third sensors 45 to determine the position taken up by the cable 12 winding on the drum 32, 33 and such a layer will allow the actual velocity of the cable 12 to be derived, starting from that of the drum.

The third sensors 45, in the preferred embodiment, are combined with an arm containing the cable-pressing roller, which is constantly pressed against the cable wound in the drum to keep it in order. When the wound cable goes up a level, the cable-pressing roller moves away from the drum (by an amount equal to the diameter of the wound cable) taking up a configuration that is deviated (generally such devices rotate on a pivot fixed to the frame of the winch) and discreet. By detecting these discreet positions with proximity sensors 45, or (in a more complicated and expensive way) by inserting a continuous detector of the position of the arm, it is possible to determine the position of the cable and the relative winding layer, since the shape of the drum is geometrically known. The control unit 43 is thus able to derive the direction and value of the running velocity of the cable 12 upstream of the winch 13, 14 without the need to receive information from the second sensor means 42.

Preferably, the first sensors 41 can be rotation encoders, of the known type, respectively installed on the two winches 13 and 14, for example encoders mounted outside of the shoulders of the drums 32, 33, reading with a pulley in contrast or with a gear system, or with returned transmission systems (belts, pulleys, chains, . . . ) the rotation velocity and/or the position of the drum itself. Such a system will be able to detect velocity and direction of rotation of the drums 32, 33. A first variant of such an encoder is represented by an encoder inserted directly on the axis of the drum; a second variant provides for the encoder to be integrated directly in the motor 30, 31. In this last case, knowing the reduction ratio of the reducer it is possible to determine the rotation velocity of the winches 13, 14.

A further variant, for directly detecting the velocity of the drums 32, 33, is that which provides for inserting a toothed wheel coaxially to the drum and a proximity sensor that is positioned facing the teeth of the wheel, at a predetermined distance and fixedly connected to the fixed part used as a support. The rotation of the wheel produces a number of pulses on the sensor that is proportional to the number of teeth. By measuring the time interval between two consecutive pulses and since the angular position between the two teeth is geometrically known, it is possible to derive the velocity (but not the direction of rotation).

The sensors 42 can be alternatives to the first sensors 41, and 45 or they can advantageously be used in combination with the first ones, to increase the precision of the control system since the running velocity of the cable 12 cannot be directly and precisely derived from the rotation velocity of the drum 32, 33 of the two winches 13 and 14. The running velocity of the load-bearing cable 12 downstream of each of the two winches 13 and 14, indeed, is also a function of the winding diameter of the cable itself, and therefore depends on the layer of cable 12 unwinding or winding up. Indeed, as the layer of cable changes the winding diameter varies; in particular, as the winding diameter increases the pull exerted decreases proportionally (for the same torque delivered by the motors 30, 31 of the two winches 13 and 14) but the running velocity of the cable 12 increases with inverse law.

Advantageously, by comparing the measurements of running velocity of the cable derived from the sensors 41, 45 with those measured directly by the sensors 42, it is possible to detect possible errors in one of the two measurement systems. The control unit 43 can in this case indicate the anomaly and select as preselected, the measurement of running velocity indicated by the measurement system that it considered to work best. Alternatively, it could show to the operator both of the values or make an average of them (if the values are very close).

Moreover, based on the detections of the second sensors or of the first sensors 41 and 45, the electronic control unit 43 can calculate the velocity of ascent/descent of the digging head 11 taking into account the lifting tackle of the digging machine 10. Such a velocity of ascent/descent can, indeed, be obtained for example by calculating the difference between the first and the second running velocities of the load-bearing cable 12 and multiplying it by a multiplication ratio relative to the number of pulleys that support the digging head 11.

The sensors 42, in the preferred embodiment, are made through a pair of pulleys that are mounted opposite the cable 12. The axial running movement of the load-bearing cable 12 imposes a rotation on the pulleys through the effect of friction and such a rotation is detected by an encoder sensor that determines at least its rotation velocity (measuring the amount of cable that has passed, or a variation in length, in a unit of time) and, if necessary, also the direction (which can in any case be determined by controlling the actuation of the winches 13, 14). Again in the preferred embodiment, the two pulleys are adjustable in position, so as to clamp them on the cable to exert the desired friction. Since the diameter of the pulley is known, with the measurement of the rotation velocity, it is possible to derive the running velocity of the cable 12.

In a first variant the two pulleys are each equipped with an encoder to determine two velocity values to be compared with one another. In a second variant the sensor on the pulley is a proximity system as described in the present text.

The reading position of the sensor 42 on the branch connected to the first winch 13 can be any position comprised between the winch 13 itself and the section of cable comprised up to the upper return pulley 24. In particular, the preferred position indicated in FIG. 1, is arranged close to the head 19, so that the cable 12 remains in a fixed spatial position and the support at the sensor 42 is simplified. If it were positioned in the vicinity of the winch, one would have to take into account the fact that the cable during the movements brushes between one shoulder of the drum and the opposite one and passing from different winding layers.

Vice-versa, the positioning of the sensor 42 attached to the branch of the winch 14 can be installed between the winch 14 and the return pulley 24 that defines the middle of the pulling system.

In an alternative embodiment, the sensors 42 can be of the optical, magnetic or equivalent type. Preferably, the electronic control unit 43 is a PLC unit, or a microprocessor. The connection between the electronic control unit 43 and the sensors 41 and 42 can be cabled or it can be made via ether through at least one pair of antennae respectively coupled with the unit 43 and with the sensors 41 and 42.

Preferably, the control system 40 also comprises user interface means 44, for example a keypad or a touch-screen monitor, a lever, a knob or a joystick, connected to the electronic control unit 43 and arranged to receive commands from a user allowing him to vary the target velocity and/or to manually actuate the two winches 13 and 14.

Such interface means 44 can be mounted on the digging and/or drilling machine 10 of earth at the support tower 17; in this case the tower 17 becomes a real control station and can be equipped with a cockpit 50 from which the user can control the machine 10. Alternatively, the interface means 44 can be connected via ether to the electronic control unit 43. In this case the control system 40 can be controlled remotely. Preferably, when the measurement system of the running velocity of the cable 12 is not of the direct type, but derived, then in combination with the sensors 41 the control system 40 will comprise at least two third sensors 45 arranged to detect the layer and/or the position of the load-bearing cable 12. The electronic control unit 43 can thus be arranged to control the inversion of the direction of rotation of the two winches 13 and 14, keeping the difference between the first and the second running velocity constant (thus inverting the directions and the values of the running velocities between the two branches); in this way the load-bearing cable is prevented from completely unwinding from the drum of one of the two winches 13 and 14, whilst still continuing digging without interruptions.

Indeed, the storage capacity of the cable on one of the two drums 32, 33 is finite and the control system 40 must be able to instantly check the capacity of cable still able to be stored before completely running out. Sufficiently before this occurs the control system 40 can act in manual mode warning the operator of the problem, or in automatic mode by inverting directions and velocity values between the two branches so as to leave the differential velocity unchanged (given by the difference of the running velocities in the two branches of cable 12 downstream of the winches 13, 14). As an alternative to the system which is provided with the sensor 45, it is possible to measure the capacity of the cable wound on the drum, determine over time how much cable has left the drum or has been stored and find the new position of the cable determining whether it is on the same layer or on a subsequent one or on a preceding one. Knowing the running velocity of the branch, the initial position (winding number on the drum and layer) of the cable, the control unit 43 determines the new position of the cable on the drum (winding and layer number), knowing its geometric parameters (base diameter, width between the shoulders, loops always wound, initial loops, . . . ).

During the mounting of the cable 12, it is possible to identify the initial position of the cable on both of the drums 32, 33, or advantageously it is possible to install an amount of cable so as to fill to maximum capacity at least one of the two drums 32, 33 leaving the other 33, 32 at the minimum. In both cases it is possible to determine the position of the cable on the respective drum to which it belongs (winding and layer number) and such a position can be inserted in the control unit 43 as initial position.

The measurement of the amount of cable that leaves the drum or that is stored is linked to the velocity measured by the sensors 41 and/or 42 and from the time in which such actuation took place, which allows the control unit 43 to define how much cable has been wound or unwound. In addition, a depth gauge connected directly to the digging tool 11 can be inserted to determine the position of the tool to be compared with the derived one, calculated knowing the initial capacity of cable and those wound on the drums at a certain moment. Such a comparison can be used to verify the effectiveness of the measurement tools.

A variant of the solution in which there are both the sensors 41 and 45 and the sensors 42 is that of inserting a further fourth sensor 51 to determine at least the rotation velocity and the direction of the return pulley 24. This sensor 51, made for example in the same way as the previous ones already described (e.g. as an encoder) determining the rotation velocity of the pulley and knowing the geometric parameters, allows the control unit 43 to calculate the differential velocity between the two branches, at this point knowing at least one running velocity of one of the two branches downstream of the winches 13, 14, it is possible for the control unit to be able to determine the other running velocity of the cable 12 on the other winch 14, 13.

As described earlier, the measurement of velocity is equivalent to the measurement of the variation in position in a unit of time. Therefore, the fourth sensor 51 can be arranged to measure, instead of the rotation velocity of the return pulley 24, the position of the digging head 11 with respect to a predetermined reference point at predetermined time intervals. In this case, for example, the fourth sensor 51 can be made through a depth gauge connected at one end to the tool (mobile part) and at a second end to the fixed part (arm, head, . . . ) which, at predetermined or known time intervals, determines the variations in position. Such a measurement is equivalent to the measurement of velocity.

Therefore, knowing the two running velocities of the two branches of cable 12 downstream of the winches 13, it is possible to determine the differential velocity with which the tool can move by difference between the measured values; or by measuring this differential velocity and the running velocity of at least one branch of cable 12, it is possible to determine the other running velocity of the second branch by the difference between the two.

When the two winches 13, 14 wind and unwind cable by the same amount, the differential velocity is zero (the digging tool 11 does not move) and the velocity measurement of the cable measured through the sensor 51 will be equal to that measured on the section of cable 12 downstream of one of the two winches 13, 14. When, on the other hand, the winches 13, 14 wind and unwind cable by different amounts from one another, the velocity derived by the sensor 51 will be less than the maximum on the branches downstream of the winches 13, 14 and linked in proportion to the tackle existing on the suspension pull.

If the two winches 13, 14 wind or unwind simultaneously by the same amount the velocity measured on the sensor 51 will be zero.

Preferably, the motors 30, 31 of the two winches 13 and 14 are of the hydraulic type, of the electric type or of the type using permanent magnets. In the case of electric motors or ones using permanent magnets it is possible to carry out finer adjustments and with greater efficiency of the rotation velocity of the winches with respect to the case of hydraulic motors. Moreover, the electric motors can support transients with increases in torque, up to 30% of their nominal value, and therefore they could exert greater pulls in the case of exceptional events.

From the description that has been made the characteristics of the control system for a machine for digging and/or drilling earth and of a digging and/or drilling machine, object of the present invention, are clear, just as the relative advantages are also clear. The control system is indeed able not only to obtain very low values of the velocity of ascent/descent of the digging head but it also allows very fine adjustments of such a velocity to be carried out.

The adjustment is carried out by actuating the two winches in such a way as to unwind the cable from one of the two and simultaneously wind it on the other one; in this way the velocity of ascent/descent of the digging head depends on the difference between the winding velocity and the unwinding velocity of the cable. The smaller such a difference, the slower the ascent or descent of the digging head will be, whilst keeping high rotation velocities of the drums of the individual winches, and in particular with rotation velocities that fall within the optimal operating range—for example in terms of efficiency, velocity or drive torque—of the electric, hydraulic or other type of motors that actuate the winches.

It is thus possible to carry out very fine and precise adjustments of the velocity of ascent/descent of the digging head 11.

It is also possible to install the control system according to the present invention in digging and/or drilling machines in operation, with relatively little adaptations, intervention time and costs and without having to replace the winches.

The motors of the two winches can be smaller than a machine equipped with a single winch and therefore, having a lower inertia, allow rapid inversions of the motion of the digging head 11.

Moreover, the use of two winches makes it possible to store the cable necessary to reach very great digging depths on board the digging machine.

The control system, according to the present invention, thus makes it possible to substantially increase the field of variation of the velocities of ascent/descent of the digging head. Indeed, it is possible to obtain very low and precise velocities of ascent/descent similar to those that can be obtained from known digging machines equipped with a large number of return pulleys, and at the same time quite high velocities for fast approach strokes (even without digging), with fast descent and rising in very deep trenches or wells, for digging in very soft earth.

Finally, it is clear that the control system for a machine for digging and/or drilling earth and 1a digging and/or drilling machine thus conceived can undergo numerous modifications and variants, all of which are covered by the invention. Indeed, even if FIG. 1 illustrates a machine with an articulated arm, the invention can concern any digging and/or drilling machine like for example a crane excavator or a vertical tower drill.

Moreover, all of the details can be replaced by technically equivalent elements. In practice, the materials used, as well as the dimensions, can be whatever according to the technical requirements.

According to an alternative to the embodiment illustrated in FIG. 1, instead of the two pulleys 21 it is possible to insert a single pulley of sufficiently large diameter to exceed the bulk of the arm 16, the same for the pulleys 22.

Moreover, if the preselected pull is in second then there will be a single pulley 26 of the two represented in FIG. 1 and the upper return pulley 24 will be absent. In this case the sensor 51 can be fixedly connected to the single pulley 26 (if it is immobile then the digging tool is immobile or is ascending and descending, if it is in rotation then there is relative running of cable between one winch 13, 14 and the other 14, 13).

The winches 13, 14 are represented as installed on the tower 17, but they could also be mounted on the arm 16 of the machine 10.

The invention claimed is:

1. A control system for a machine for digging or drilling earth, said machine for digging or drilling earth comprising:
   a digging head arranged to dig ground;
   a flexible load-bearing cable arranged to support said digging head during operation; and
   a first winch comprising a first drum about which at least part of the flexible load-bearing cable is wound, and a first motor arranged to actuate, in rotation, said first drum;
   a second winch comprising a second drum about which at least part of the flexible load-bearing cable is wound and a second motor arranged to actuate, in rotation, said second drum;
   an electronic control unit adapted for controlling the movement of the first winch and the second winch;
   a velocity sensor device arranged in each branch of the flexible load-bearing cable coming out from each of the first winch and the second winch and adapted for monitoring the movement of said flexible load-bearing cable;

said electronic control unit being arranged to calculate the differential velocity with which the digging head can move, based on the detections of the velocity sensor device.

2. System according to claim 1 wherein said velocity sensor devices comprises at least two first sensors, arranged to detect a rotation velocity and a direction of rotation of the first drum and the second drum.

3. System according to claim 1, wherein said velocity sensor device comprises two second sensors arranged to detect a first and a second running velocity of the flexible load-bearing cable downstream of said first winch and said second winch.

4. System according to claim 2, wherein the first sensors are combined with third sensors to determine a position taken up by the flexible load-bearing cable winding on the first drum and the second drum so as to allow the actual velocity of the flexible load-bearing cable to be derived, starting from that of the first drum and the second drum.

5. System according to claim 2, wherein the control unit, through measurements of the first sensors and knowing geometric parameters of the first drum and the second drum, including base diameter of the first drum and the second drum, width between the shoulders of the first drum and the second drum, and parameters of the cable wound on the first drum and the second drum, including number of loops wound, determines the running velocity in each branch of the flexible load-bearing cable.

6. System according to claim 2, wherein said first sensors are rotation encoders respectively installed on the first winch and the second winch.

7. System according to claim 3, wherein the second sensors comprise a pair of pulleys that are mounted opposite the flexible load-bearing cable, so that axial running movement of the flexible load-bearing cable imposes a rotation on the pulleys through friction and so that such a rotation is detected by an encoder sensor that determines at least its rotation velocity.

8. System according to claim 7, wherein each pulley of the pair of pulleys is adjustable in position, so as to clamp on the flexible load-bearing cable to exert a desired friction.

9. System according to claim 1, wherein in a manual operating mode an operator acts on actuations of the motors of the first winch and the second winch determining the velocity of descent of the digging head and the control unit, based on the information received from the velocity sensor device, calculates the final velocity of movement of the digging head that is displayed to the operator on the control panel.

10. System according to claim 1, wherein in a semi-manual operating mode an operator selects a desired operative velocity of descent or ascent of the digging head, the control unit determines the pairs of velocities of the two branches of the load-bearing cable in output from the first winch and the second winch, also determining their direction of rotation (the same way or opposite ways), so that the flexible load-bearing cable accumulates in a predetermined and desired manner on one of the first winch or the second winch.

11. System according to claim 1 wherein in addition to the velocity sensor device there are digging sensors that measure parameters such as a rotation torque of blades and revolutions of milling heads.

12. System according to claim 11, wherein the control unit in an automatic mode controls the actual correct progress of digging based on measurements of the digging sensors and based on the velocity sensor device.

13. System according to claim 11, wherein the position of the flexible load-bearing cable wound on at least one of the first drum or the second drum is monitored.

14. System according to claim 1, wherein the control unit is capable of inverting direction and velocity values of the first winch and the second winch leaving the differential velocity of the cable downstream of them unchanged.

15. System according to claim 12, also comprising a load cell positioned on a pin of a suspension pulley so as to directly detect the load on the pulley itself, such a value determining the overall pull in contrast to the weight of the digging head.

16. System according to claim 2, wherein the direction of rotation of the first winch is determined by the actuations of the first winch.

17. System according to claim 1, wherein said velocity sensor device comprises a device for measuring the position of the digging head with respect to a predetermined reference point at predetermined time intervals.

18. Control system for a machine for digging and/or drilling earth, wherein said machine for digging and/or drilling earth comprises:
 a digging head arranged to dig soil;
 a flexible load-bearing cable arranged to support said digging head during normal operation;
 at least a first winch and a second winch, each of the first winch and the second winch which in turn comprises a drum about which at least part of the flexible load-bearing cable can be wound, and a motor arranged to actuate said drum;
 a load-bearing arm on the head of which respective return pulleys of the cable are provided, the head having an extension of the arm extending from it, at the top of which at least one upper return pulley is constrained,
 said digging head being equipped with a block comprising at least one lifting pulley,
 the flexible load-bearing cable being fixed at one end to the drum of the first winch, relayed, by such return pulleys, by the lifting pulley of the head, by the upper return pulley and finally fixed at the other end to the drum of the second winch,
 an electronic control unit adapted for controlling the rotation of the first winch and the second winch,
 at least one velocity sensor device arranged on a branch of flexible load-bearing cable coming out from the winches adapted for monitoring the movement of said flexible load-bearing cable,
 at least a fourth sensor arranged to determine the rotation velocity or to measure the position of the digging head with respect to a predetermined reference point at predetermined time intervals and the direction of the return pulley,
 said electronic control unit being arranged to calculate the differential velocity with which the digging head can move based on the detections of the velocity sensor device and of the fourth sensor.

19. System according to claim 18, wherein said velocity sensor device comprises a device for measuring the position of the digging head with respect to a predetermined reference point at predetermined time intervals.

* * * * *